(12) United States Patent
Maeda

(10) Patent No.: US 10,215,283 B2
(45) Date of Patent: Feb. 26, 2019

(54) SEALING DEVICE

(71) Applicant: NOK CORPORATION, Tokyo (JP)

(72) Inventor: Toshiyuki Maeda, Kitaibaraki (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/534,954

(22) PCT Filed: Sep. 17, 2015

(86) PCT No.: PCT/JP2015/076398
§ 371 (c)(1),
(2) Date: Jun. 9, 2017

(87) PCT Pub. No.: WO2016/092932
PCT Pub. Date: Jun. 16, 2016

(65) Prior Publication Data
US 2017/0343109 A1    Nov. 30, 2017

(30) Foreign Application Priority Data

Dec. 12, 2014  (JP) .................... 2014-252009

(51) Int. Cl.
*F16J 15/16* (2006.01)
*F16J 15/18* (2006.01)
(Continued)

(52) U.S. Cl.
CPC .............. *F16J 15/18* (2013.01); *F16J 9/14* (2013.01); *F16J 9/28* (2013.01); *F16J 15/3208* (2013.01); *F16J 15/3272* (2013.01); *F16J 15/46* (2013.01)

(58) Field of Classification Search
CPC ................. F16J 15/18; F16J 15/46; F16J 9/14
See application file for complete search history.

(56) References Cited

U.S. PATENT DOCUMENTS 1,527,603 A * 2/1925 Perrenoud .................. F16J 9/00
                                                          277/441
3,860,250 A * 1/1975 Lundquist ................ F16J 15/32
                                                          277/589
(Continued)

FOREIGN PATENT DOCUMENTS

CA      2193053 A1   7/1997
CN    1 513 095 A    7/2004
(Continued)

OTHER PUBLICATIONS

Extended European Search Report for Application No. EP 15 86 7643 dated Nov. 20, 2017 (5 pages).

*Primary Examiner* — Gilbert Y Lee
(74) *Attorney, Agent, or Firm* — Harness, Dickey & Pierce, P.L.C.

(57) ABSTRACT

The present invention is to provide a sealing device that has a small number of parts as three or less to achieve a more compact sealing device. The sealing device is combined an inner seal ring, an outer seal ring held in an outer circumferential holding groove of the inner seal ring, and a back ring. The outer seal ring satisfies a dimensional size relationship of T>A when T is the radial thickness dimension of the outer seal ring, G is the protrusion gap dimension, R is the radial width dimension of the chamfered sections on the edges of the open side of the seal installation groove, and A is the sum of the protrusion gap dimension G and the radial width dimension R of the chamfered sections on the edges of the open side.

13 Claims, 15 Drawing Sheets

(51) Int. Cl.
*F16J 9/14* (2006.01)
*F16J 9/28* (2006.01)
*F16J 15/3208* (2016.01)
*F16J 15/3272* (2016.01)
*F16J 15/46* (2006.01)

(56) References Cited

U.S. PATENT DOCUMENTS

| | | | |
|---|---|---|---|
| 4,179,131 A | | 12/1979 | Nussbaumer |
| 5,156,410 A | * | 10/1992 | Hom .................. F15B 1/24 |
| | | | 277/556 |
| 5,845,909 A | | 12/1998 | Angelo et al. |
| 2004/0164496 A1 | | 8/2004 | Okada et al. |

FOREIGN PATENT DOCUMENTS

| | | |
|---|---|---|
| CN | 2 703 168 Y | 6/2005 |
| CN | 201396434 Y | 2/2010 |
| CN | 203146806 U | 8/2013 |
| EP | 0 392 470 A2 | 10/1990 |
| GB | 2024365 A | 1/1980 |
| JP | S63-312567 A | 12/1988 |
| JP | H06-071965 U | 10/1994 |
| JP | H10-184926 A | 7/1998 |
| JP | H10-213231 A | 8/1998 |
| JP | 2002-156045 A | 5/2002 |
| JP | 2005-221028 A | 8/2005 |
| JP | 2007-107571 A | 4/2007 |
| WO | WO-90-000693 A1 | 1/1990 |

\* cited by examiner

FIG. 3A
FIG. 3B
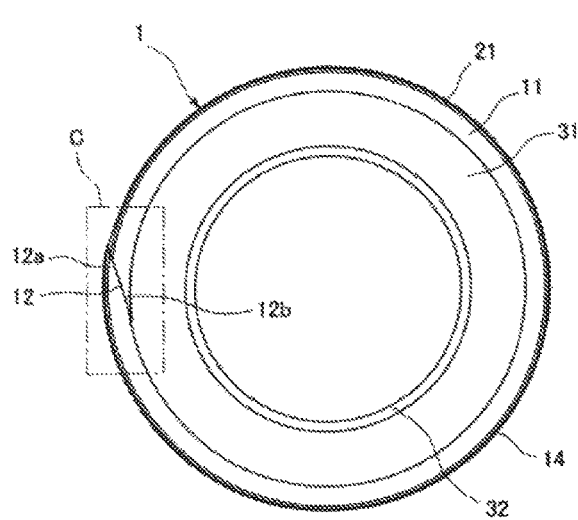
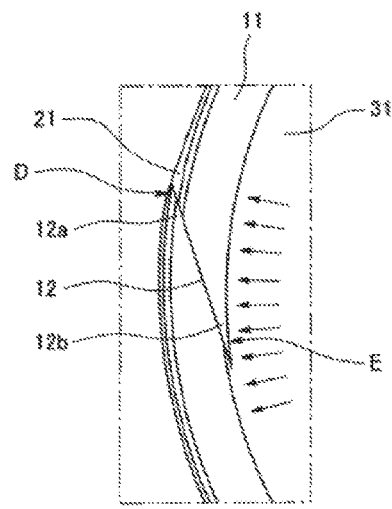

FIG. 5A
FIG. 5B
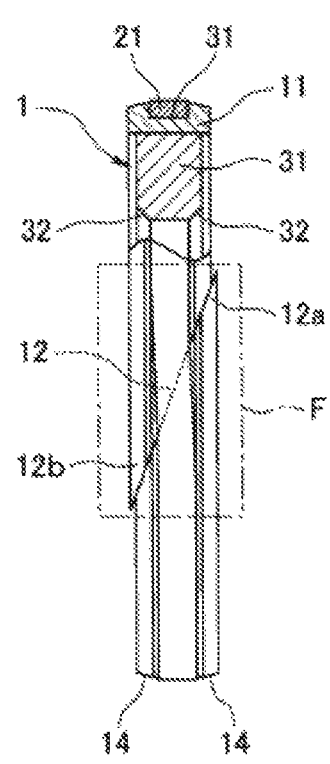
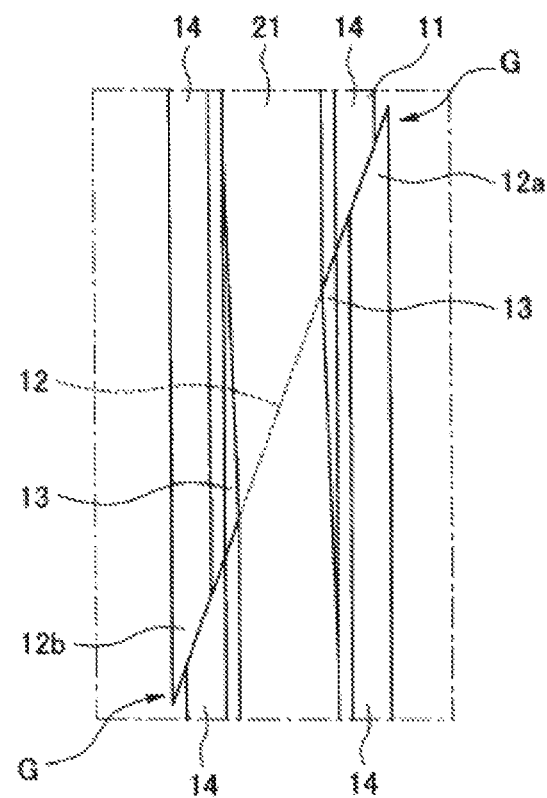

FIG. 6A
FIG. 6B
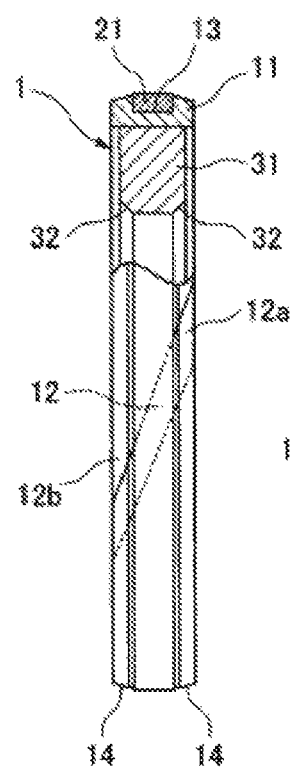
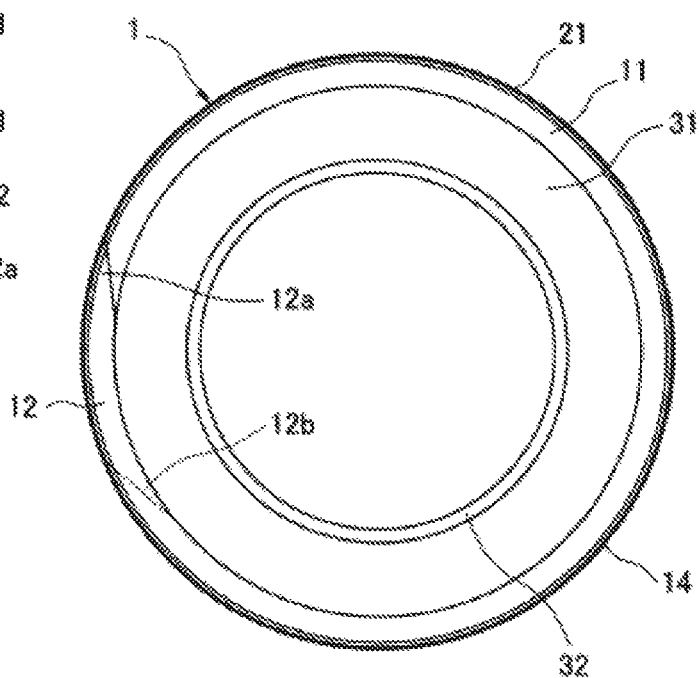

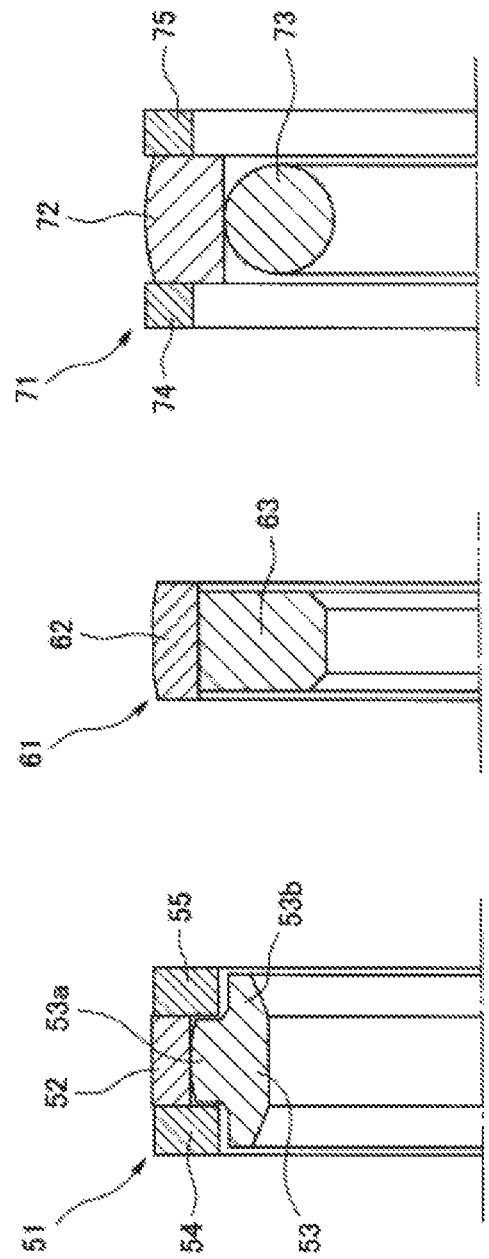

SEALING DEVICE

CROSS-REFERENCE TO RELATED APPLICATIONS

This application is a U.S. National Stage Application of International Application No. PCT/JP2015/076398, filed on Sep. 17, 2015, and published in Japanese as WO 2016/092932 A1 on Jun. 16, 2016 and claims priority to Japanese Application No. 2014-252009, filed on Dec. 12, 2014. The entire disclosures of the above applications are incorporated herein by reference.

BACKGROUND OF THE INVENTION

Field of the Invention

The present invention relates to a sealing device pertaining to sealing technology. The sealing device of the present invention is used as, for example, a piston seal for a reciprocating hydraulic cylinder, a seal in other hydraulic equipment, or the like.

Description of the Conventional Art

Piston seals for high pressure reciprocating hydraulic cylinders such as the sealing device 51 shown in FIG. 16A have been conventionally known. This sealing device 51 seals high-pressure hydraulic oil or the like between a piston and a cylinder by being fitted in an annular fitting groove provided in an outer circumferential surface of the piston and slidably closely contacting an inner circumferential surface of the cylinder. Specifically, the sealing device 51 is configured by combining a seal ring 52 made of PTFE that slidably closely contacts the inner circumferential surface of the cylinder; a back ring 53 made of NBR and having a convex cross-sectional shape, the back ring 53 being composed of an annular convex portion 53a disposed on the inner circumferential side of the seal ring 52 and supporting the seal ring 52, and a base portion 53b wider than the convex portion 53a; and a pair of backup rings 54 and 55 made of polyamide resin and disposed so as to sandwich the seal ring 52 and the convex portion 53a of the back ring 53.

Considering the shape, disposal, material characteristics, and the like of each component, the sealing device 51 of FIG. 16A is capable of exhibiting excellent sealability, but the number of components is great, which leads to problems of larger installation space and high part costs.

As such, in recent years, a more compact and inexpensive sealing device 61, such as that shown in FIG. 16B, configured by combining a seal ring 62 made of polyamide resin and a back ring 63 made of NBR has begun to be used.

On the other hand, as shown in FIG. 16C, a piston seal utilizing a complex groove shape has also been developed. This sealing device 71 is configured by combining a seal ring 72 made of PTFE that slidably closely contacts the inner circumferential surface of the cylinder; a back ring 73, made of NBR and having a circular cross section, disposed on an inner circumferential side of the seal ring 72; and a pair of backup rings 74 and 75 made of polyamide resin and disposed so as to sandwich the seal ring 72. Compared to the sealing device 51 of FIG. 16A and the sealing device 61 of FIG. 16B, this sealing device 71 has lower sliding resistance.

In a comparison of the sealing device 61 of FIG. 16B and the sealing device 71 of FIG. 16C, from the perspective of reducing the weight of the cylinder device, the compact sealing device 61 of FIG. 16B is preferable, but from the perspective of protrusion resistance, the sliding surface of the sealing device 61 of FIG. 16B is formed of highly rigid polyamide resin, and the coefficient of friction of polyamide resin is high. As such, the sealing device 61 of FIG. 16B has great sliding resistance and sliding heat generation compared to the sealing device 71 of FIG. 16C. Therefore, from the perspective of the life of the sealing device (sealing system), the sealing device 61 of FIG. 16B is inferior to the sealing device 71 of FIG. 16C.

Currently, a sealing device has not been developed whereby both a compact design such as that of the sealing device 61 of FIG. 16B and low sliding resistance (low friction) are both achieved in a compatible manner.

SUMMARY OF THE INVENTION

Problem to be Solved by the Invention

The present invention is made by taking into consideration the above-described points, and an object of the present invention is to provide a sealing device including a small number of components, specifically not more than three components, thereby making it possible to achieve a more compact sealing device having protrusion resistance and lower sliding resistance.

Means for Solving the Problem

To achieve the object described above, a sealing device according to the invention of a first aspect is a sealing device fitted in a fitting groove provided in an opposing surface of an inner circumferential side member among the inner circumferential side member and an outer circumferential side member that move relative to each other and face each other. Additionally, the sealing device slidably closely contacts an opposing surface of the outer circumferential side member, thereby suppressing leaking of a sealing target from a high pressure side to a low pressure side between opposing surfaces of the two members. This sealing device includes a combination of an inner seal ring disposed on an inner circumferential side of the opposing surface of the outer circumferential side member, an outer seal ring held in a holding groove provided in an outer circumferential surface of the inner seal ring and slidably contacting the opposing surface of the outer circumferential side member, and a back ring disposed on an inner circumferential side of the inner seal ring. In this sealing device, the inner seal ring is formed from a material having higher rigidity than the outer seal ring and includes a cut portion at one location on a circumference thereof; the outer seal ring is formed from a material having lower friction and lower rigidity than the inner seal ring and is formed endless circumferentially; and the back ring is formed from a material having higher elasticity than the outer seal ring and the inner seal ring and has elasticity to press the outer seal ring against the opposing surface of the outer circumferential side member via the inner seal ring. Moreover, the outer seal ring is configured to satisfy the relationship:

$$T > A$$

where T is a radial thickness dimension of the outer seal ring, G is an protrusion gap dimension in the sealing device, R is a radial width dimension of an open side edge chamfered portion of a seal fitting groove provided in an outer circumferential surface of the inner circumferential side member, and A is a sum of the protrusion gap dimension G and the radial width dimension of the open side edge chamfered portion R.

The sealing device according to the invention of a second aspect is the sealing device according to the first aspect, wherein a concave shape configured to suppress passing is provided in an axial end surface of the inner seal ring; and the concave shape is shaped in the inner seal ring at a time of molding the inner seal ring, using a convex shape cut by an end mill on a cavity inner surface of a molding die configured to mold the inner seal ring.

The sealing device according to the invention of a third aspect is the sealing device according to the first aspect or the second aspect, wherein the outer seal ring is formed from PTFE, urethane, or rubber; the inner seal ring is formed from a high-strength resin material; and the back ring is formed from rubber or urethane.

The sealing device according to the invention of a fourth aspect is the sealing device according to the first aspect, the second aspect, or the third aspect, wherein the cut portion is configured as a bias cut or a step cut.

The sealing device according to the invention of a fifth aspect is the sealing device according to the fourth aspect, wherein the bias cut is configured as a combination of a bias cut and a straight cut formed at a cut end portion of the bias cut.

The sealing device of the present invention provided with the configuration described above is formed by combining the inner seal ring disposed on the inner circumferential side of the opposing surface of the outer circumferential side member, the outer seal ring held in the holding groove provided in the outer circumferential surface of the inner seal ring and slidably contacting the opposing surface of the outer circumferential side member, and the back ring disposed on the inner circumferential side of the inner seal ring. Thus, the sealing device of the present invention is formed from three components, which is less than the four components of the sealing device 51 of FIG. 16A and the sealing device 71 of FIG. 16C described above. Additionally, the outer seal ring is held in the holding groove provided in the outer circumferential surface of the inner seal ring, and the back ring is disposed on the inner circumferential side of the inner seal ring. As a result, the three components are lined up side by side in the radial direction of the sealing device. Moreover, the outer seal ring is held in the holding groove provided in the outer circumferential surface of the inner seal ring and, as such, both rings are disposed such that at least a portion of both rings overlaps in the radial direction of the sealing device. Accordingly, the number of components is kept low, to three, and these three components are lined up side by side in the radial direction of the sealing device and, as such, a configuration is achieved in which axial direction width of the sealing device is small. Moreover, the inner seal ring and the outer seal ring are disposed such that at least a portion of both rings overlaps in the radial direction and, as such, a configuration is achieved in which radial direction width of the sealing device is small. As a result, the sealing device is compact, overall.

The outer seal ring that slidably contacts the opposing surface of the outer circumferential side member is molded from a material having low friction and low rigidity and, as such, sliding resistance is kept low. The material of the outer seal ring is preferably PTFE, urethane, or rubber.

If the outer seal ring is molded from a material having low friction and low rigidity, the outer seal ring may extrude into a gap between the inner circumferential side member and the outer circumferential side member and become damaged. However, in the present invention, the outer seal ring is held in the holding groove provided in the outer circumferential surface of the inner seal ring, as described above. As such, the outer seal ring is less likely to extrude into the gap between the inner circumferential side member and the outer circumferential side member. On the other hand, the inner seal ring is molded from a material having high rigidity and, as such, the inner seal ring is also less likely to extrude into the gap between the inner circumferential side member and the outer circumferential side member. The material of the inner seal ring is preferably a high-strength resin material.

Note that if the inner seal ring is molded from a material having high rigidity as described above, there is a concern that the elasticity of the back ring disposed on the inner circumferential side thereof will not be transmitted to the outer seal ring on the outer circumferential side and, as a result, it will not be possible for the back ring to press the outer seal ring against the opposing surface of the outer circumferential side member. However, in the present invention, the inner seal ring is provided with the cut portion at one location on the circumference thereof. As such, it is possible to transmit the elasticity of the back ring to the outer seal ring. The material of the back ring is preferably rubber or urethane.

The cut portion has a shape formed by cutting the inner seal ring at one location on the circumference thereof, and the inner seal ring may significantly elasticity deform in the radial direction due to the cut portion. The shape of the cut portion is not particularly limited to a specific shape, but is preferably a bias cut with a shape formed by cutting the ring diagonally, a step cut with a shape formed by cutting the ring in a step-like manner, or the like.

Bias cuts have a shape formed by cutting a ring diagonally to the circumferential direction and, as such, there is a concern that the tip of the cut end portion will become a point with an angle less than a right angle and that this point will be thin and easily damaged. As a countermeasure, combining the bias cut in the inner seal ring with a straight cut at the cut end portion of the bias cut has been considered. In this case, the tip of the cut end portion is provided with the radial direction thickness of straight cut and, thus, the strength of the tip of the cut end portion can be increased. The straight cut has a shape formed by cutting a ring on a plane including the central axis of the ring.

To prevent the inner seal ring from extruding into the gap between the inner circumferential side member and the outer circumferential side member, a configuration is preferable in which a relationship is satisfied:

$$T > A \qquad \text{Relationship (1)}$$

where T is a radial thickness dimension of the outer seal ring, G is an protrusion gap dimension in the sealing device, R is a radial width dimension of an open side edge chamfered portion of a seal fitting groove provided in an outer circumferential surface of the inner circumferential side member, and A is a sum of the protrusion gap dimension G and the radial width dimension R of the open side edge chamfered portion. With this configuration, protrusion of the inner seal ring can be prevented by the following mechanism.

Specifically, as shown as a comparative example in FIG. 12, if the relationship of Relationship (1) is reversed to have the configuration:

$$T < A \qquad \text{Relationship (2)}$$

when high pressure P acts on the inner seal ring 11 from one side in the axial direction, large shearing stress will act on the groove bottom extended plane (in FIG. 12, the plane indicated by the dotted line marked on the cross-section of the inner seal ring 11) that originates from the groove bottom of the holding groove 13. This is because there is no wall supporting the portion (in FIG. 12, the portion more to the outer circumferential side than the dotted line marked on the cross-section of the inner seal ring 11) positioned on the low pressure side of the holding groove 13 in the inner seal ring 11. As a result, there is a concern that the inner seal ring 11 will become damaged, as shown in FIG. 13.

In contrast, if Relationship (1) is used as shown above, when high pressure P acts on the inner seal ring 11 from one side in the axial direction as shown in FIG. 14, large shearing stress will not act on the groove bottom extended plane (in FIG. 14, the plane indicated by the dotted line marked on the cross-section of the inner seal ring) that originates from the groove bottom of the holding groove 13. This is because the portion (in FIG. 14, the portion more to the outer circumferential side than the dotted line marked on the cross-section of the inner seal ring) positioned on the low pressure side of the holding groove 13 in the inner seal ring 11 is at least partially supported by the side surface of the seal fitting groove 42. Therefore, this can prevent the inner seal ring 11 from becoming damaged.

The open side edge chamfered portion 42a of the seal fitting groove 42 provided in the outer circumferential surface of the inner circumferential side member 41 may be a round chamfer with an arcuate cross-sectional shape or a tapered chamfer with a linear cross-sectional shape. When the open side edge chamfered portion 42a is a round chamfer with an arcuate cross-sectional shape, a radial width dimension R thereof will be determined (defined) by the radial dimension of the arc (R).

When the concave shape for suppressing passing is provided in the end surface on one side in the axial direction of the inner seal ring, the concave shape is preferably shaped by using an end mill to cut a convex shape on the cavity inner surface of the molding die configured to mold the inner seal ring, and using this molding die in which the convex shape has been cut using the end mill.

That is, as a comparative example, in a case where the convex shape is formed on the cavity inner surface of the molding die for molding the inner seal ring by electric discharge machining, and the concave shape is shaped using this molding die in which the convex shape has been formed by electric discharge machining, there is a concern that the cost of fabricating the molding die will rise steeply and part costs will rise steeply. In contrast, in a case where the convex shape is cut on the cavity inner surface of the molding die for molding the inner seal ring using an end mill as described above, and the concave shape is shaped using this molding die in which the convex shape has been cut using the end mill, the cost of fabricating the molding die will be relatively low and steep increases in part costs can be suppressed.

Effect of the Invention

According to the present invention, the following advantageous effects are obtained.

Specifically, in the present invention, as described above, the number of components of the sealing device is kept low, to three, and these three components are lined up side by side in the radial direction of the sealing device and, as such, a configuration is achieved in which axial direction width of the sealing device is small. Moreover, the inner seal ring and the outer seal ring are disposed such that at least a portion of both rings overlaps in the radial direction and, as such, a configuration is achieved in which radial direction width of the sealing device is small. As a result, the sealing device is compact, overall. The outer seal ring that slidably contacts the opposing surface of the outer circumferential side member is molded from a material having low friction and low rigidity and, as such, sliding resistance is kept low. Additionally, the outer seal ring is held in the holding groove provided in the outer circumferential surface of the inner seal ring and, as such, the outer seal ring will not extrude into the gap between the inner circumferential side member and the outer circumferential side member. Additionally, the inner seal ring is molded from a material with high rigidity and, as such, the inner seal ring will not extrude into the gap between the inner circumferential side member and the outer circumferential side member. As a result, damage to both seal rings due to protrusion is prevented. Damage to the seal rings due to protrusion is also realized by the configuration of Relationship (1) above. Accordingly, in line with the intended object of the present invention, a sealing device can be provided that includes a small number of components, thereby making it possible to achieve a more compact sealing device that has protrusion resistance and lower sliding resistance. Additionally, the strength of the cut end portion tip can be increased as a result the structure of the cut portion, that is, combining a straight cut at the end portion of the bias cut. Moreover, the concave shape is shaped by using an end mill to cut a convex shape on the cavity inner surface of the molding die for molding the inner seal ring, and using the molding die on which the convex shape has been cut using the end mill. As such, the costs of fabricating the molding die and the part costs of the seal rings molded using the molding die can be reduced.

BRIEF EXPLANATION OF THE DRAWINGS

FIG. 2A is a partial cut-away front view of the sealing device. FIG. 2B is a side view of the sealing device.

FIGS. 3A and 3B are drawings showing an operating state of the cut portion. FIG. 3A is a side view of the sealing device. FIG. 3B is an enlarged view of section C of FIG. 3A.

FIG. 4A is a partial cut-away front view of the sealing device. FIG. 4B is a side view of the sealing device.

FIGS. 5A and 5B are drawings showing an operating state of the cut portion. FIG. 5A is a front view of the sealing device. FIG. 5B is an enlarged view of section F of FIG. 5A.

FIGS. 6A and 6B are drawings showing a third example of a cut portion provided in the sealing device. FIG. 6A is a partial cut-away front view of the sealing device. FIG. 6B is a side view of the sealing device.

FIG. 7A is a partial cut-away front view of the sealing device. FIG. 7B is a side view of the sealing device.

FIG. 9A is a partial cut-away front view of the sealing device. FIG. 9B is a side view of the sealing device.

FIG. 15A is a cross-sectional view of the main components. FIG. 15B is a plan view of the main components. FIG. 15C is a side view of the main components.

FIG. 16A is a cross-sectional view of the main components of a sealing device according to a conventional example. FIGS. 16B and 16C are cross-sectional views of the main components of sealing devices according to other conventional examples.

DETAILED DESCRIPTION OF PREFERRED EMBODIMENTS

Next, a description of the embodiments of the present invention will be given while referencing the drawings.

Figure 1:
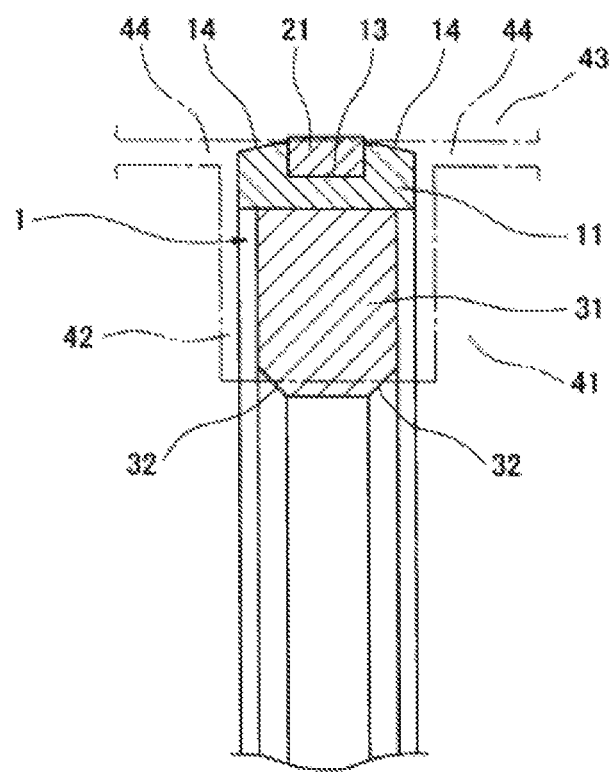
FIG. 1 is a cross-sectional view of the main components of a sealing device according to an embodiment of the present invention.

FIG. 1 shows a cross-sectional view of the main components of a sealing device 1 according to an embodiment of the present invention. The sealing device 1 according to the present embodiment is fitted in a fitting groove 42 that has an annular shape and is provided in an opposing surface (outer circumferential surface) of a piston 41 among the piston (inner circumferential side member) 41 and a cylinder (cylinder tube or outer circumferential side member) 43 of a reciprocating hydraulic cylinder that move relative to each other and face each other, and slidably closely contacts an opposing surface (inner circumferential surface) of the cylinder 43, thereby suppressing leaking of a sealing target (oil or the like) from a high pressure side to a low pressure side between the opposing surfaces of the piston 41 and the cylinder 43. The sealing device 1 is configured from a combination of components, namely, an inner seal ring 11, an outer seal ring 21 disposed on an outer circumferential side of the inner seal ring 11 between the inner seal ring 11 and the cylinder 43, and a back ring 31 disposed on an inner circumferential side of the inner seal ring 11 between the inner seal ring 11 and a groove bottom of a fitting groove 42.

Figure 2A:
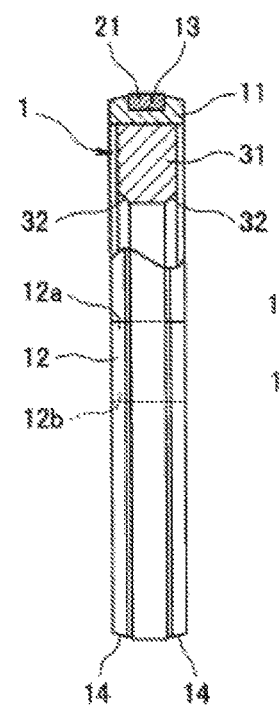
FIGS. 2A and 2B are drawings showing a first example of a cut portion provided in the sealing device.
Figure 2B:
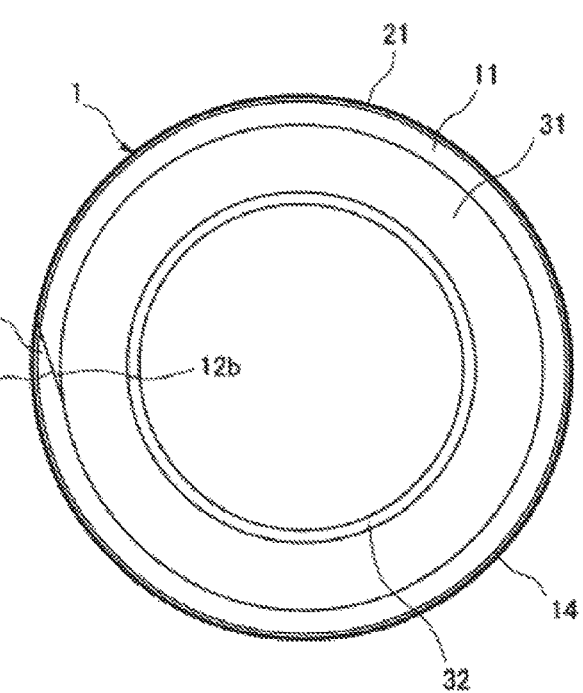

In the sealing device 1, the inner seal ring 11 is formed from a material having higher rigidity than the outer seal ring 21, specifically polyamide resin, polyacetal resin, polyethylene resin, polyimide resin, PEEK, or a similar high-strength resin material (tensile strength: 40 MPa or greater). The inner seal ring 11 is formed with a size whereby an outer diameter thereof does not interfere with the opposing surface of the cylinder 43, and such that a predetermined radial direction gap is formed between the inner seal ring 11 and the opposing surface of the cylinder 43 without the inner seal ring 11 contacting the opposing surface of the cylinder 43. That is, the inner seal ring 11 is configured to have an outer diameter dimension that is slightly smaller than the inner diameter dimension of the cylinder 43. Additionally, as shown in FIGS. 2A and 2B, the inner seal ring 11 is provided with a cut portion 12 at one location on the circumference thereof, a shape of the cut portion being formed by cutting the inner seal ring 11 at one location on the circumference of the inner seal ring 11. Additionally, the inner seal ring 11 is molded with a rectangular cross-sectional shape that is long in the axial direction; a holding groove 13 having an annular shape is provided in a center portion in the axial direction of the outer circumferential surface of the inner seal ring 11; and an inclined surface 14 having an annular shape is provided on each of both end portions in the axial direction of the outer circumferential surface, oriented such that the outer diameter dimension thereof gradually shrinks from the center portion in the axial direction to the edge portions in the axial direction. The cut portion 12 is described later.

The outer seal ring 21 is formed from a material having lower friction and lower rigidity than the inner seal ring 11, specifically PTFE (polytetrafluoroethylene resin), urethane, or rubber. The outer seal ring 21 is fitted into the holding groove 13 provided in the outer circumferential surface of the inner seal ring 11 and is held by the inner seal ring 11. Moreover, the outer seal ring 21 is formed with a size whereby the outer seal ring 21 slidably closely contacts the opposing surface of the cylinder 43. That is, the outer diameter dimension of the outer seal ring 21 is configured to be slightly larger than the inner diameter dimension of the cylinder 43. Additionally, the outer seal ring 21 is formed in an endless shape and does not have a cut portion in the circumference thereof. Furthermore, the outer seal ring 21 is molded with a rectangular cross-sectional shape that is long in the axial direction, and is held in the holding groove 13. The outer seal ring 21, with the exception of the outer circumferential portion thereof, is held in the holding groove 13 by the inner circumferential portion thereof and, as such, the inner seal ring 11 and the outer seal ring 21 are disposed overlapped partially in the radial direction thereof.

Additionally, the back ring 31 is formed from a material having higher elasticity than the inner seal ring 11 and the outer seal ring 21, specifically rubber or urethane, and has elasticity whereby the outer seal ring 21 is pressed against the opposing surface of the cylinder 43 via the inner seal ring 11. That is, the inner diameter dimension of the back ring 31 is configured to be slightly smaller than the outer diameter dimension of the groove bottom portion of the fitting groove 42. Additionally, the back ring 31 is formed in an endless shape and does not have a cut portion in the circumference thereof. Moreover, the back ring 31 is molded with a rectangular cross-sectional shape that is long in the axial direction, the axial direction width of the back ring 31 is configured to be slightly smaller than the axial direction width of the inner seal ring 11, and a chamfered portion 32 is provided on each of both end portions in the axial direction of the inner circumferential surface of the back ring 31.

As shown in FIGS. 2A and 2B, the cut portion 12 is configured as a bias cut with a shape formed by diagonally cutting the inner seal ring 11 at one location on the circumference thereof. More specifically, the cut portion 12 is configured such that the cut face is displaced in the circumferential direction between an outer circumferential surface portion and an inner circumferential surface portion (FIG. 2B), and an end surface portion on one side and an end surface portion on the other side in the axial direction of the inner seal ring 11 are not displaced in the circumferential direction (FIG. 2A). Moreover, the cut face is configured to have an inclined planar shape. Accordingly, a pair of cut end portions 12a and 12b is configured so as to be side by side in the radial direction of the inner seal ring 11 with one of the cut end portions riding up on the other cut end portion.

In the sealing device 1 provided with the configuration described above, the number of components is kept to three, namely the inner seal ring 11, the outer seal ring 21, and the back ring 31, and these three components are lined up in a single row in the radial direction. As such, a configuration is achieved in which the axial direction width of the sealing device 1 is small. Additionally, the inner seal ring 11 and the outer seal ring 21 are disposed overlapped partially in the radial direction. As such, a configuration is achieved in which radial direction width of the sealing device 1 is small. As a result, the sealing device 1 is compact, overall. Additionally, the outer seal ring 21 that slidably contacts the opposing surface of the cylinder 43 is molded from the material having low friction and low rigidity and, as such, sliding resistance is kept low. Furthermore, the outer seal ring 21 is held in the holding groove 13 provided in the outer circumferential surface of the inner seal ring 11 and, as such, the outer seal ring 21 will not extrude into the gap 44 between the piston 41 and the cylinder 43. Additionally, the inner seal ring 11 is molded from the material having high rigidity and, as such, the inner seal ring 11 will not extrude into the gap 44 between the piston 41 and the cylinder 43. As a result, damage to both of the seal rings 11 and 21 due to protrusion is prevented. Accordingly, a sealing device 1 can be provided that includes a small number of components, thereby making it possible to achieve a more compact sealing device 1 having protrusion resistance and lower sliding resistance.

In the sealing device 1 provided with the configuration described above, the inner seal ring 11 made from the high-strength resin material such as polyamide resin or the like is provided, and this inner seal ring 11 is formed with a size whereby the inner seal ring 11 does not interfere with the opposing surface of the cylinder 43. As such, the inner seal ring 11 does not become a resistance element when assembled on the cylinder 43. On the other hand, the outer seal ring 21 that does become a resistance element is made from PTFE, urethane, or rubber and, as such, the outer seal ring 21 elastically deforms in a relatively easy manner and has a small resistance load. Accordingly, the assembly load on the cylinder 43 can be reduced and assembly work can be simplified.

The cut portion 12 provided at one location on the circumference of the inner seal ring 11 is configured as a bias cut diagonal to the circumferential direction of the seal ring instead of as a step cut at a right angle to the circumferential direction of the seal ring. As such, even if the inner seal ring 11 expands or contracts in the circumferential direction due to the influence of heat, the state of the cut end portions 12a and 12b riding up on each other will be maintained, and a gap will not be created between the cut end portions 12a and 12b. Accordingly, the outer seal ring 21 and/or the back ring 31 can be prevented from extruding into a gap (not shown in the drawings) between the cut end portions 12a and 12b and becoming damaged.

The formation of leak pathways is suppressed by the following mechanism in cases where the circumferential length of the inner seal ring 11 changes due to heat or the like, and the cut end portions 12a and 12b of the bias cut are displaced from each other. Specifically, even if the outer circumferential side cut end portion 12a of the bias cut is displaced so as to protrude outward in the radial direction from the inner circumferential side cut end portion 12b as shown in section D of FIG. 3B, leak pathways will not be formed because the outer seal ring 21 is present on the outer circumferential side of the outer circumferential side cut end portion 12a. Additionally, even if the inner circumferential side cut end portion 12b of the bias cut is displaced so as to protrude inward in the radial direction from the outer circumferential side cut end portion 12a as shown in section E of FIG. 3B, leak pathways will be constricted because the inner circumferential side cut tip portion 21b will deform in a fitting manner due to the expansion forces of the back ring 31. Thus, sufficient sealing functions can be maintained with this structure.

Note that configurations are possible in which the bias cut of the cut portion 12 in the inner seal ring 11 described above has following structures.

Second Example of the Cut Portion

Figure 4A:
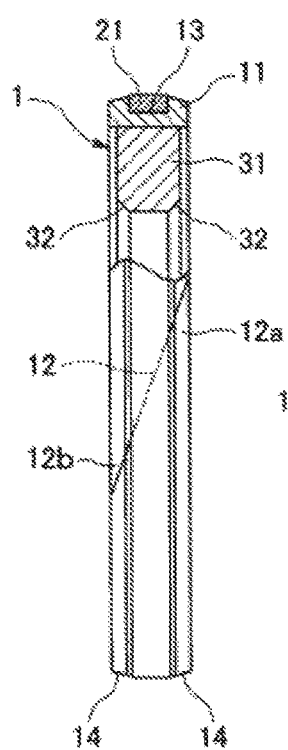
FIGS. 4A and 4B are drawings showing a second example of a cut portion provided in the sealing device.
Figure 4B:
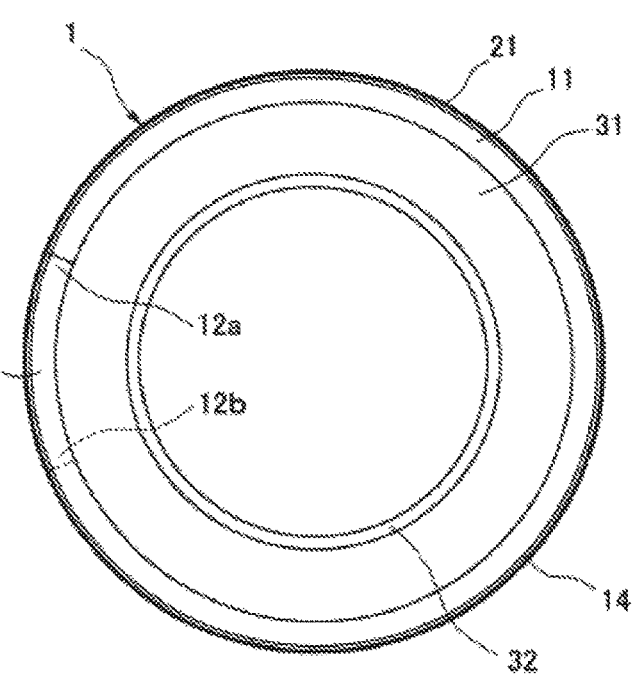

In a second example shown in FIGS. 4A, 4B, 5A and 5B, the bias cut of the cut portion 12 is configured such that the cut face is displaced in the circumferential direction between an end surface portion on one side and an end surface portion on the other side in the axial direction of the inner seal ring 11 (FIG. 4A), and not displaced in the circumferential direction between the outer circumferential surface portion and the inner circumferential surface portion of the inner seal ring 11 (FIG. 4B). Moreover, the cut face is configured to have an inclined planar shape. Accordingly, a pair of cut end portions 12a and 12b is configured so as to be side by side in the axial direction of the inner seal ring 11 with one of the cut end portions riding up on the other cut end portion. In this case, even if one of the cut end portions of the bias cut protrudes in the axial direction from the other cut end portion as shown in section G of FIG. 5B, leak pathways communicating (penetrating) in the axial direction will not be formed. Therefore, sufficient sealing functions can be maintained.

Third Example of the Cut Portion

In a third example shown in FIGS. 6A and 6B, the bias cut of the cut portion 12 is configured such that the cut face is displaced in the circumferential direction between an end surface portion on one side and an end surface portion on the other side in the axial direction of the inner seal ring 11 (FIG. 6A), and also displaced in the circumferential direction between the outer circumferential surface portion and the inner circumferential surface portion of the inner seal ring 11 (FIG. 6B). Moreover, the cut face is configured to have an inclined planar shape. Accordingly, a pair of cut end portions 12a and 12b is configured so as to be side by side in a slanting direction with respect to both the axial direction and the radial direction of the inner seal ring 11, with one of the cut end portions riding up on the other cut end portion. In this case, even if the diagonal outer circumferential side cut end portion 12a of the bias cut is displaced so as to protrude outward in the radial direction from the diagonal inner circumferential side cut end portion 21b, leak pathways will not be formed because the outer seal ring 21 is present on the outer circumferential side of the diagonal outer circumferential side cut end portion 12a. Additionally, even if the diagonal inner circumferential side cut end portion 12b of the bias cut is displaced so as to protrude inward in the radial direction from the diagonal outer circumferential side cut end portion 12a, leak pathways will be constricted because the diagonal inner circumferential side cut end portion 21b will deform in a fitting manner due to the expansion forces of the back ring 31. Moreover, even if one of the cut end portions of the bias cut is displaced so as to protrude in the axial direction from the other cut end portion, leak pathways communicating (penetrating) in the axial direction will not be formed. Thus, sufficient sealing functions can be maintained with this structure.

Fourth Example of the Cut Portion

As described above, the bias cut of the cut portion 12 is obtained by making a cut in the inner seal ring 11 diagonal to the circumferential direction. As such, the tips of the cut end portions 12a and 12b are points with an angle less than a right angle and these points are thin and easily damaged. As a countermeasure, combining the bias cut with a straight cut 15 at the cut end portions 12a and 12b of the bias cut has been considered. In this case, the tips of the cut end portions 12a and 12b are provided with the thickness of the straight cut 15 and, thus, the strength of the tips of the cut end portions 12a and 12b can be increased. The cut face of the straight cut 15 extends in the radial direction of the inner seal ring.

Figure 7A:
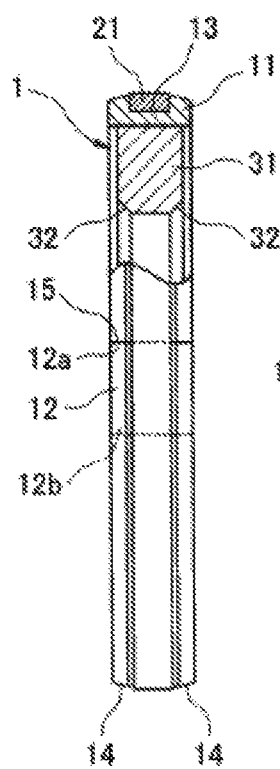
FIGS. 7A and 7B are drawings showing a fourth example of a cut portion provided in the sealing device.
Figure 7B:
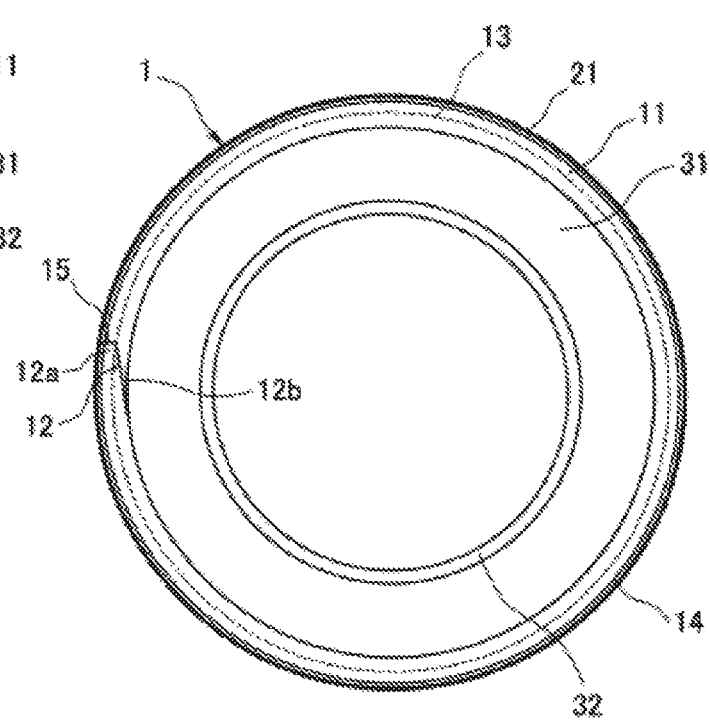
Figure 8:
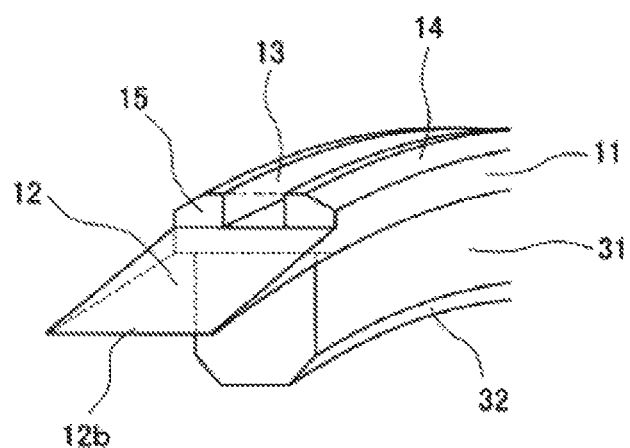
FIG. 8 is a drawing explaining the shape of the cut portion.

As such an example, FIGS. 7A, 7B, and FIG. 8 show a fourth example of a combination of the bias cut and the straight cut 15. In the fourth example, the cut face is configured to be displaced in the circumferential direction between the outer circumferential surface portion and the inner circumferential surface portion of the inner seal ring 11 (FIG. 7B), and not displaced in the circumferential direction between the end surface portion on one side and the end surface portion on the other side in the axial direction of the inner seal ring 11 (FIG. 7A). Moreover, the cut face is configured from a combination of a diagonal planar portion on the inner circumferential side formed by the bias cut 12, and a right angle planar portion on the outer circumferential side extending along the axial direction of the inner seal ring 11 and formed by the straight cut 15. Thus, with this structure, the tip of the outer circumferential side cut end portion 12a is provided with the axial direction thickness of the straight cut 15 and, as such, the strength of the tip can be increased and the occurrence of damage such as cracks, chips, and the like can be suppressed. Note that the axial direction width of the straight cut 15 is preferably configured to be approximately the same as the groove depth of the holding groove 13.

Fifth Example of the Cut Portion

Figure 9A:
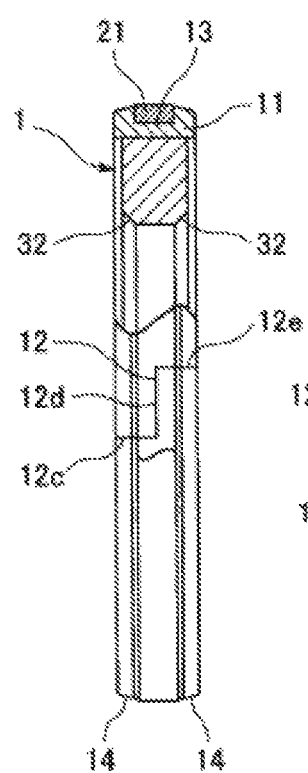
FIGS. 9A and 9B are drawings showing a fifth example of a cut portion provided in the sealing device.
Figure 9B:
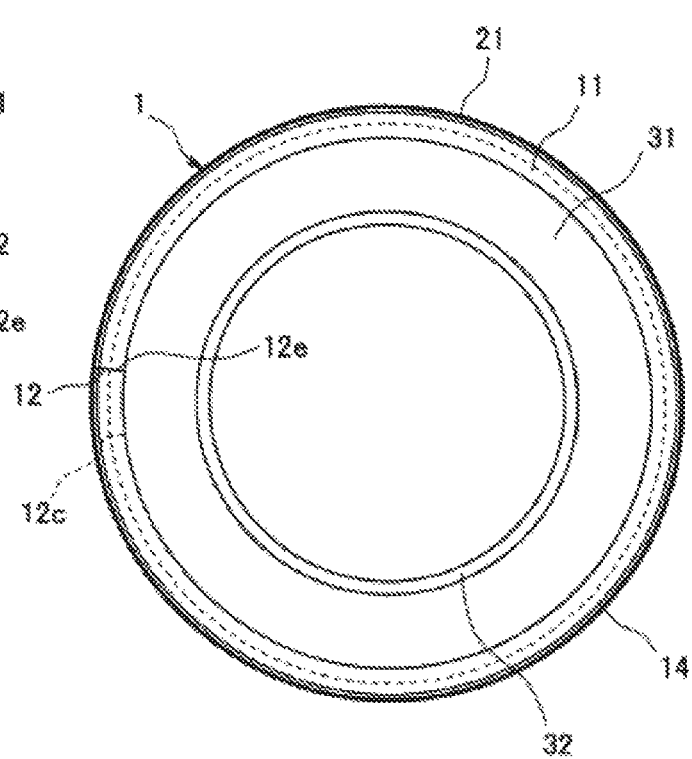

The cut portion 12 of the inner seal ring 11 may be configured as a step cut in addition to as a bias cut. For example, as shown in FIGS. 9A and 9B, the step cut has a shape formed by making a step-like cut in the inner seal ring 11 at one location on the circumference thereof. That is, a first surface 12c with a planar shape orthogonal to the circumferential direction of the seal ring, a second surface 12d with a planar shape parallel to the circumferential direction of the seal ring, and a third surface 12e with a planar shape orthogonal to the circumferential direction of the seal ring are lined up side by side and the cut shape of the seal ring 11 is configured from these three surfaces 12c, 12d, and 12e.

The present inventor also performed comparative testing of sliding resistance and sliding heat generation using the sealing device 1 of the present embodiment (FIGS. 9A and 9B), the sealing device 51 of FIG. 16A, and the sealing device 61 of FIG. 16B as samples. Testing methods and test results are described below.

Figure 10:
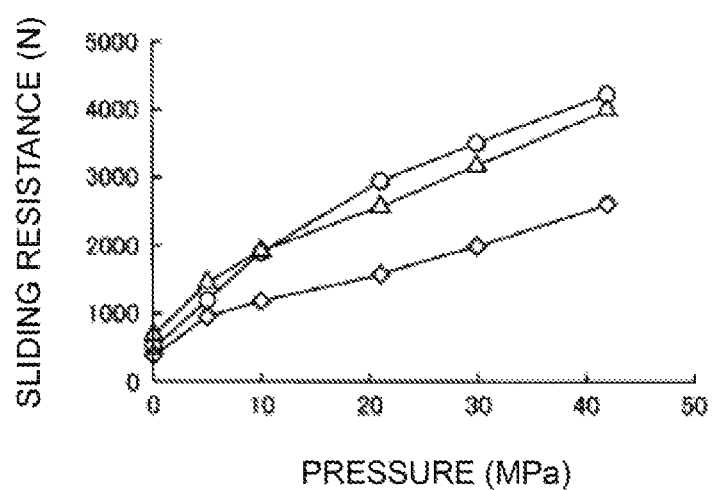
FIG. 10 is a graph showing results of comparative testing of sliding resistance.
Figure 11:
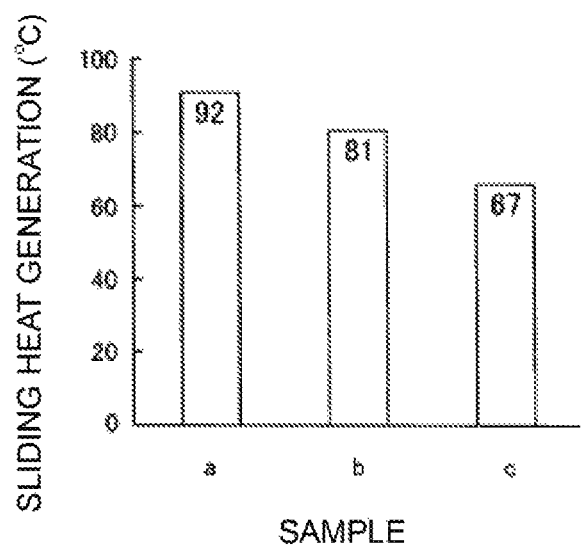
FIG. 11 is a graph showing results of comparative testing of sliding heat generation.
Figure 12:
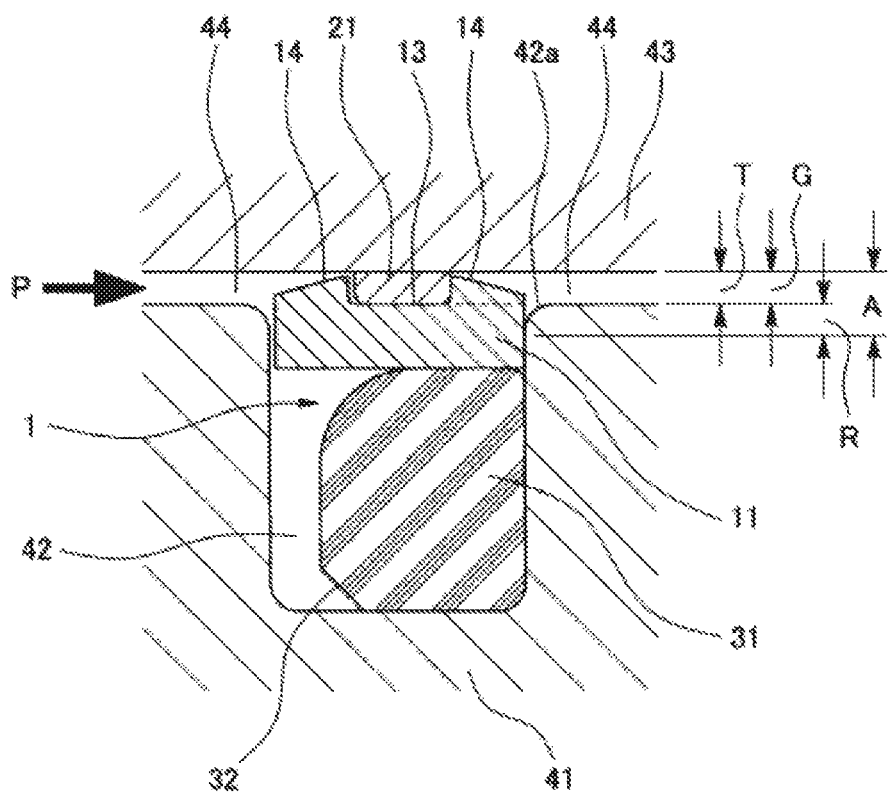
FIG. 12 is a cross-sectional view of the main components of a sealing device according to a comparative example, showing an installed state.

(1) Comparative Testing of Sliding Resistance.
Testing Method
Sliding resistance generated for each sample was measured under the following conditions:
Cylinder diameter: φ100
Sliding speed: 100 mm/s
Temperature: 100° C.
Oil type: Engine oil SAE10W
Test Results
The test results are shown in the graph of FIG. 10 (○ plotted points: sealing device 51 of FIG. 16A; △ plotted points: sealing device 61 of FIG. 16B; ◇ plotted points: sealing device 1 of the embodiment). From these results, it can be confirmed that generated sliding resistance was reduced with the sealing device 1 of the embodiment compared to the sealing device 51 of FIG. 16A and the sealing device 61 of FIG. 16B.
(2) Comparative Testing of Sliding Heat Generation
Testing Method
Sliding heat generated for each sample was measured under the following conditions:
Cylinder diameter: φ100
Pressure: 10 MPa
Sliding speed: 50 mm/s
Temperature: Natural rise in temperature
Test Results
The cylinder surface temperature gradually rises after sliding is started. Sliding heat generation refers to the temperature reached when the cylinder surface temperature is saturated. The test results are shown in the graph of FIG. 11 (Sample a: sealing device 51 of FIG. 16A; Sample b: sealing device 61 of FIG. 16B; Sample c: sealing device 1 of the embodiment). From these results, it can be confirmed that, generated sliding heat was reduced with the sealing device 1 of the embodiment compared to the sealing device 51 of FIG. 16A and the sealing device 61 of FIG. 16B.

In the embodiment described above, the inner seal ring 11 in which the bias cut, step cut, or the similar cut portion 12 is provided at one location on the circumference thereof is formed with a size whereby the outer diameter of the inner seal ring 11 does not interfere with the opposing surface of the cylinder 43, and such that a predetermined radial direction gap is formed between the inner seal ring 11 and the opposing surface of the cylinder 43 without the inner seal ring 11 contacting the opposing surface of the cylinder 43. That is, the inner seal ring 11 is configured to have an outer diameter dimension that is slightly smaller than the inner diameter dimension of the cylinder 43. However, configurations are possible in which the inner seal ring 11 contacts the opposing surface of the cylinder 43, and the inner seal ring 11 is formed with a size whereby the outer diameter of the inner seal ring 11 interferes with the opposing surface of the cylinder 43. That is, a configuration is possible in which the outer diameter dimension of the inner seal ring 11 is a size equal to or greater than the inner diameter dimension of the cylinder 43. In this case, the outer seal ring 21 contacts the opposing surface of the cylinder 43 and, also, the inner seal ring 11 contacts the opposing surface of the cylinder 43.

Figure 13:
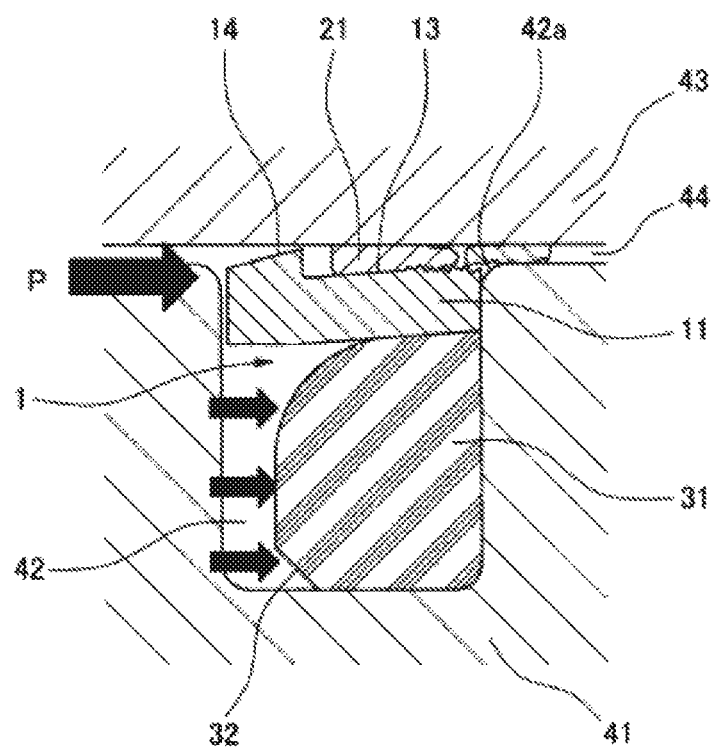
FIG. 13 is a cross-sectional view of the main components of the sealing device, showing a state where a defect has occurred.
Figure 14:
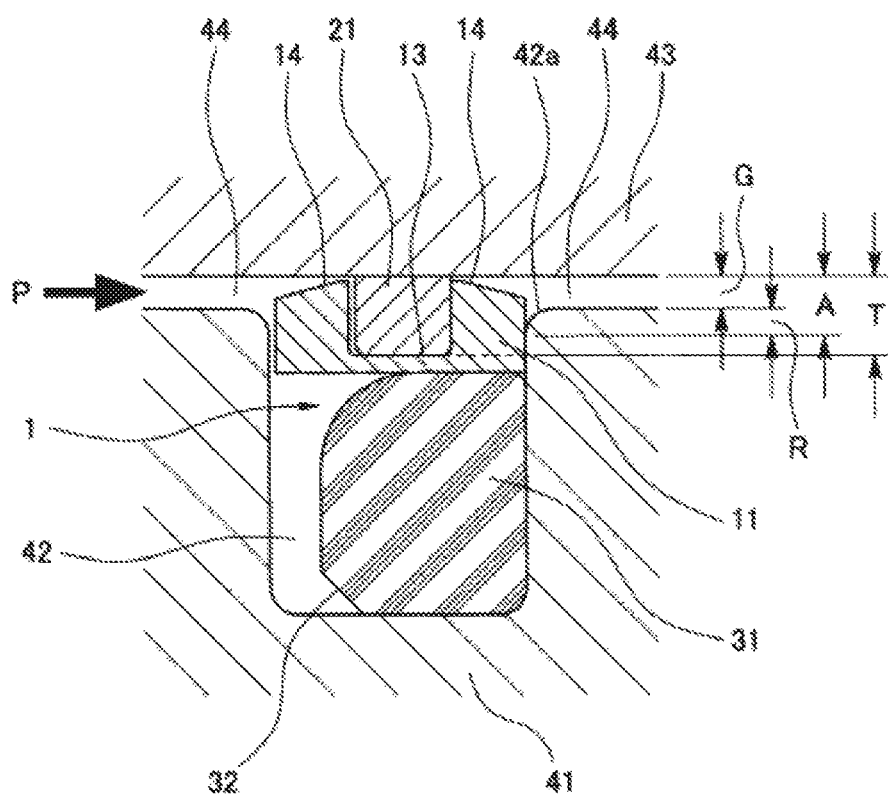
FIG. 14 is a cross-sectional view of the main components of a sealing device according to another embodiment of the present invention, showing an installed state.

Next, in the example shown in FIG. 14, in addition to the configuration described above, the outer seal ring 21 is configured to satisfy the relationship:

$$T > A \quad \text{Relationship (1)}$$

where T is a radial thickness dimension of the outer seal ring 21, G is a protrusion gap dimension (radial direction dimension of the gap 44 between the piston 41 and the cylinder 43) in the sealing device 1, R is a radial width dimension of an open side edge chamfered portion 42a of a seal fitting groove 42 provided in an outer circumferential surface of the piston 41, and A is a sum of the protrusion gap dimension G and the radial width dimension R of the open side edge chamfered portion. Thus, as described above, when high pressure P acts on the inner seal ring 11 from one side in the axial direction, large shearing stress will not act on the groove bottom extended plane (in FIG. 14, the plane indicated by the dotted line marked on the cross-section of the inner seal ring) that originates from the groove bottom of the holding groove 13. This is because the portion (in FIG. 14, the portion more to the outer circumferential side than the dotted line marked on the cross-section of the inner seal ring) positioned on the low pressure side of the holding groove 13 in the inner seal ring 11 is supported by the inner side surface of the seal fitting groove 42. This can prevent the inner seal ring 11 from becoming damaged as shown in FIG. 13.

The open side edge chamfered portion 42a of the seal fitting groove 42 provided in the outer circumferential surface of the inner circumferential side member 41 is a round chamfered portion with an arcuate cross-sectional shape, and the radial width dimension R of the open side edge chamfered portion 42a is defined by the radial dimension of the arc (R).

Note that the configuration satisfying Relationship (1) above is not limited to that of the example shown in FIG. 14, and the configuration of any of the examples shown in FIGS. 1 to 9A and 9B may also be used.

Figure 15B:
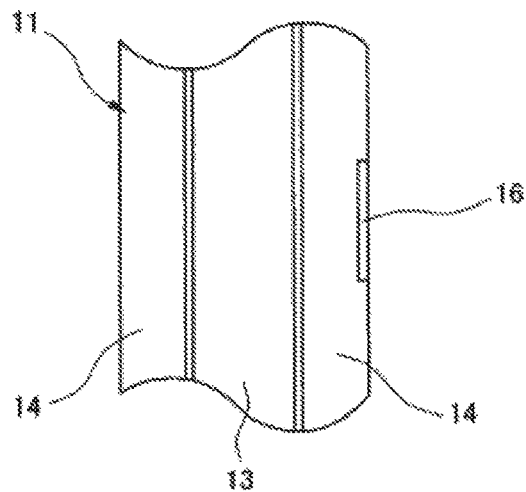
FIGS. 15A to 15C are single part drawings of inner seal rings provided in the sealing device.
Figure 15A:
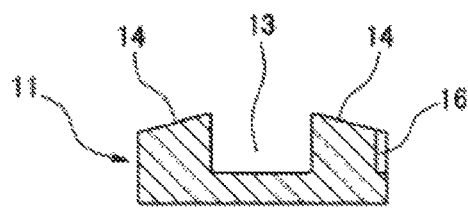
Figure 15C:
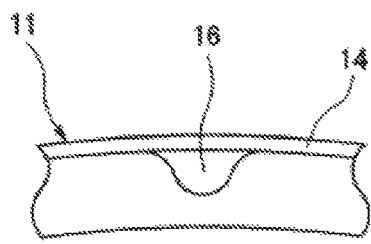

Next, in the example shown in FIGS. 15A, 15B and 15C, in addition to the configuration described above, the concave shape 16 for suppressing passing is provided in the end surface on one side in the axial direction of the inner seal ring 11. The concave shape 16 is shaped by using an end mill to cut a convex shape on a cavity inner surface of a molding die (not shown in the drawings) for molding the inner seal ring 11, and using this molding die in which the convex shape has been cut using the end mill. Thus, compared to a case where the convex shape is formed on the cavity inner surface of the molding die for molding the inner seal ring 11 by electric discharge machining, and the concave shape is shaped using this molding die in which the convex shape has been formed by electric discharge machining, the cost of fabricating the molding die will be relatively low and, thus, steep increases in part costs can be suppressed. The concave shape 16 is provided so as to be open to the end surface on one side in the axial direction and the outer circumferential surface of the inner seal ring 11, and is provided at a plurality of locations on the circumference of the inner seal ring 11 (e.g. at six locations on the circumference).

What is claimed is:

1. A sealing arrangement comprising:
an inner circumferential side member and an outer circumferential side member that move relative to each other and face each other, the inner circumferential side member including a seal fitting groove that faces the outer circumferential side member, the seal fitting groove having an open side edge chamfered portion; and
a sealing device that is provided in the fitting groove of the inner circumferential side member and slidably closely contacting an opposing surface of the outer circumferential side member, the sealing device being configured to suppress leaking of a sealing target from a high pressure side to a low pressure side between the inner circumferential side member and the outer circumferential side member;

wherein the sealing device comprises:
a combination of an inner seal ring disposed on an inner circumferential side of an opposing surface of the outer circumferential side member, an outer seal ring held in a holding groove provided in an outer circumferential surface of the inner seal ring and slidably contacting the opposing surface of the outer circumferential side member, and a back ring disposed on an inner circumferential side of the inner seal ring;
the inner seal ring being formed from a material having higher rigidity than the outer seal ring and including a cut portion at one location on a circumference of the inner seal ring;
the outer seal ring being formed from a material having lower friction and lower rigidity than the inner seal ring and being formed endless circumferentially;
the back ring being formed from a material having higher elasticity than the outer seal ring and the inner seal ring and having elasticity to press the outer seal ring against the opposing surface of the outer circumferential side member via the inner seal ring; and
the outer seal ring being configured to satisfy a relationship:

$T > A$ where T is a radial thickness dimension of the outer seal ring, G is a protrusion gap dimension in the sealing device, R is a radial width dimension of the open side edge chamfered portion of the seal fitting groove provided in the outer circumferential surface of the inner circumferential side member, and A is a sum of the protrusion gap dimension G and the radial width dimension R of the open side edge chamfered portion.

2. The sealing arrangement according to claim 1, wherein:
a concave shape configured to suppress passing is provided in an axial end surface of the inner seal ring; and
the concave shape is shaped in the inner seal ring at a time of molding the inner seal ring, using a convex shape cut by an end mill on a cavity inner surface of a molding die configured to mold the inner seal ring.

3. The sealing arrangement according to claim 2, wherein:
the outer seal ring is formed from PTFE, urethane, or rubber;
the inner seal ring is formed from a high-strength resin material; and
the back ring is formed from rubber or urethane.

4. The sealing arrangement according to claim 3, wherein:
the cut portion is configured as a bias cut or a step cut.

5. The sealing arrangement according to claim 4, wherein:
the bias cut is configured as a combination of a bias cut and a straight cut formed at a cut end portion of the bias cut.

6. The sealing arrangement according to claim 2, wherein:
the cut portion is configured as a bias cut or a step cut.

7. The sealing arrangement according to claim 6, wherein:
the bias cut is configured as a combination of a bias cut and a straight cut formed at a cut end portion of the bias cut.

8. The sealing arrangement according to claim 1, wherein:
the outer seal ring is formed from PTFE, urethane, or rubber;
the inner seal ring is formed from a high-strength resin material; and
the back ring is formed from rubber or urethane.

9. The sealing arrangement according to claim 8, wherein:
the cut portion is configured as a bias cut or a step cut.

10. The sealing arrangement according to claim 9, wherein:

the bias cut is configured as a combination of a bias cut and a straight cut formed at a cut end portion of the bias cut.

11. The sealing arrangement according to claim 1, wherein:
the cut portion is configured as a bias cut or a step cut.

12. The sealing arrangement according to claim 11, wherein:
the bias cut is configured as a combination of a bias cut and a straight cut formed at a cut end portion of the bias cut.

13. The sealing arrangement according to claim 1, wherein the inner ring, the outer ring, and the back ring are each formed of different materials.

* * * * *